United States Patent
Adler et al.

(10) Patent No.: US 9,983,033 B2
(45) Date of Patent: *May 29, 2018

(54) FOULING RESISTANT FLOW METERING SYSTEM

(71) Applicant: RSA PROTECTIVE TECHNOLOGIES, LLC, Claremont, CA (US)

(72) Inventors: Richard Steven Adler, Claremont, CA (US); John Replogle, Pheonix, AZ (US)

(73) Assignee: RSA PROTECTIVE TECHNOLOGIES, LLC, Claremont, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/010,561

(22) Filed: Jan. 29, 2016

(65) Prior Publication Data

US 2016/0216139 A1     Jul. 28, 2016

Related U.S. Application Data (63) Continuation of application No. 13/671,176, filed on Nov. 7, 2012, now Pat. No. 9,261,387.

(Continued)

(51) Int. Cl.
*G01F 1/42*     (2006.01)
*G01F 1/00*     (2006.01)
(Continued)

(52) U.S. Cl.
CPC ............... *G01F 1/42* (2013.01); *E02B 1/00* (2013.01); *E03F 7/00* (2013.01); *G01F 1/00* (2013.01); *G01F 1/46* (2013.01); *G01F 1/56* (2013.01); *G01F 1/66* (2013.01); *E03F 2201/20* (2013.01); *G01F 1/10* (2013.01); *G01F 15/00* (2013.01); *Y10T 137/0441* (2015.04)

(58) Field of Classification Search
CPC ..... G01F 1/00; G01F 1/10; G01F 1/42; G01F 1/46; G01F 1/56; G01F 1/66; G01F 15/00; E02B 1/00; E03F 7/00; E03F 2201/20

See application file for complete search history.

(56) References Cited

U.S. PATENT DOCUMENTS 4,365,518 A * 12/1982 Zacharias, Jr. ........... G01F 1/66
                                                          73/861.28
4,428,242 A    1/1984 Holstrom
(Continued)

OTHER PUBLICATIONS

McCrometer brochure, 2008.
(Continued)

*Primary Examiner* — Natalie Huls
(74) *Attorney, Agent, or Firm* — Huang Partners LLP (57) ABSTRACT

Appurtenances added to a pipe mitigate the effects of upstream valves, sluice gates or pipe elbows to condition the pipe flow for accurate flow rate detection by a reverse propeller meter. Further appurtenances allow the reverse propeller meter to be used in extreme debris situations such as weeds, vines and moss present in many canal systems. The system provides an electronic signal that indicates flow rate and accumulated flow volume, or the signal can be transmit to a central headquarters for remote gate control or canal automation.

13 Claims, 7 Drawing Sheets

Related U.S. Application Data (60) Provisional application No. 61/628,830, filed on Nov. 7, 2011.

(51) Int. Cl.

| | | |
|---|---|---|
| *G01F 1/66* | (2006.01) | |
| *E02B 1/00* | (2006.01) | |
| *E03F 7/00* | (2006.01) | |
| *G01F 1/46* | (2006.01) | |
| *G01F 1/56* | (2006.01) | |
| G01F 15/00 | (2006.01) | |
| G01F 1/10 | (2006.01) | |

(56) References Cited

U.S. PATENT DOCUMENTS

| | | | |
|---|---|---|---|
| 4,793,190 A | * | 12/1988 | Chang ............... G01F 1/206 116/274 |
| 4,839,038 A | | 6/1989 | McLain, II |
| 5,040,409 A | | 8/1991 | Kiewit |
| 5,041,217 A | | 8/1991 | Reid |
| 5,085,076 A | | 2/1992 | Engelmann |
| 5,261,761 A | | 11/1993 | Knappert et al. |
| 5,588,462 A | * | 12/1996 | McHugh ............... A62C 35/68 137/551 |
| 7,374,705 B2 | | 5/2008 | Tierling |
| 2002/0139197 A1 | | 10/2002 | Salamitou et al. |
| 2004/0216532 A1 | | 11/2004 | Koudal et al. |
| 2006/0230843 A1 | | 10/2006 | Penlerick |
| 2008/0037366 A1 | | 2/2008 | Smith |
| 2010/0155336 A1 | | 6/2010 | Simonson |
| 2010/0224275 A1 | | 9/2010 | Pinkerton |
| 2015/0107238 A1 | | 4/2015 | Brown et al. |

OTHER PUBLICATIONS

Blaine R. Hanson and Larry J. Schwanki, "Water Turbulance Disrupts Accuracy of Some Flow Meters", California Agriculture, v. 52, No. 1, 1998, pp. 25-30.

* cited by examiner

FIG. 3A Insert

FIG. 3B Replace

FIG. 3C Append

FIG. 3D Splice

FOULING RESISTANT FLOW METERING SYSTEM

The present application is a continuation of U.S. application Ser. No. 13/671,176, filed on Nov. 7, 2012, which claims priority to U.S. Provisional Patent Application 61/628,830, filed on Nov. 7, 2011, the entirety of which are incorporated herein by reference.

BACKGROUND

The present invention relates to a system of measuring and controlling water in channelized flowing bodies of water so as to distribute it from large delivery-system canals to irrigated-farm users.

Propeller meters of various types have been extensively employed for measuring flow rates and accumulated volume of water delivered through pipelines that have sufficient length to establish suitable flow profiles for accurate detection of flow velocity by the propeller meter. Debris accumulations on a supporting member that holds the propeller meter in a conventional position facing into the approaching flow limits their use to clean flows.

Applications of prior art using the said propeller meters are limited because, inter alia, existing pipe installations usually have insufficient length between upstream flow disturbances, such as the control sluice gate or by a pipe elbow, and the propeller meter. Conventional configurations fail to handle debris such as weed and moss debris.

SUMMARY OF THE INVENTION

Described are devices that cause debris such as, for example, weeds, grass, and other materials to bypass the blades of a propeller meter operative to generate a control signal. The propeller meter can be used to generate an electronic control signal under conditions previously considered too difficult for propeller meters.

In an embodiment, disclosed is a system of measuring and controlling water flow rate in channelized flowing bodies of water, converting the canal flow to conditioned pipeline flow while bypassing weeds, grass, and other debris, such as frequently encountered in irrigation canals. The system simultaneously conditions agitated input flows from sources such as sluice gates to produce a suitable flow profile that can use a propeller meter to generate an electronic output. The output can be used to indicate flow rate, accumulated flow delivery volume, and as a control output to regulate upstream valves or gates for flow control, remote control, or automation. Flow accuracy is sustained by the durability of the installed pipe and the use of conventional produced and calibrated sensors and propeller meters. As an alternative to water metered through a slide gate using standard orifice formulas, embodiments of the system, for example as installed downstream of the canal delivery gate, offers an accuracy of +/−2%. Field testing has verified that the claims of +/−2% is approximately sustained and far exceeds most irrigation management demands.

In an embodiment, flow sensor is a reverse propeller meter. The reverse propeller meter is configured to generate the electronic output. The system can be configured to measure canal flows or for insertion of water or canal flows into existing pipelines.

A reverse propeller meter uses a conical propeller suspended from the point, or nose, of the propeller, at the end of a 45-degree sloping support member in order to shed some leaves and short grasses. An example of a conventional reverse propeller meter is that of McCrometer, Inc., 3255 Stetson Avenue, Hemet, Calif. 92545-7799. However the reverse propeller meter fails to shed common debris materials such as, for example, long vine and moss infestations that commonly found in Western United States canal systems. As such, in one embodiment, disclosed is a pipe section equipped with appurtenances to condition a flow from an upstream sluice gate, valve or pipe elbow so that the flow is suitable for velocity detection by the reverse propeller meter. In addition, other appurtenances in the pipe pass debris safely past the flow-sensing propeller.

In an embodiment, the system is configured to replace or substitute other point sensing systems, such as magnetic probes, Pitot tubes, and acoustic based probes.

On an outlet end of the disclosed system, and its various installation situations, an added section of pipe is attached for several purposes. This section has a large slot of width approximately equal to one-third pipe diameter and of length equal to approximately one-foot length for each two cubic-feet-per-second of discharge rate. The pipe section is configured to maintain full pipe flow to accommodate a reverse propeller meter installation. In an embodiment, the pipe section comprises seepage holes to allow the pipe section to dry between uses in order to, inter alia, provide a measure of insect control (e.g. mosquitoes).

Throughout the specification and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but may refer to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly indicates otherwise.

Embodiments of the present invention are disclosed or are apparent from and encompassed by, the following description. It will be appreciated by those skilled in the art that the foregoing brief description and the following detailed description are exemplary (i.e., illustrative) and explanatory of the present invention, but are not intended to be restrictive thereof or limiting of the advantages, which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The conventional wisdom is that propeller meters, even reverse propeller meters, are severely challenged by the vegetative growth that occurs in open channel flow canal systems similar to that of an Imperial Irrigation System (IID). Many farm-irrigation, water-delivery systems deliver water through a pipe placed through the canal bank, frequently under a canal service road. The pipes are usually 20-feet to 40-feet long. The opening and closing of a canal head gate, or sluice gate, usually controls the water delivery rate. This partly open sluice gate produces a strong jet into the pipe that can cause a distorted flow profile and flow spinning that greatly affects most efforts to sense an average velocity in the available length of pipe.

As described herein, velocity-profile conditioning and control of flow spin are achieved using flow conditioning measures between the entrance gate and the propeller meter that control both, and produced a desired uniform-flow profile for the propeller, or most any sensor, to detect average velocity. This system can be installed in most locations where the farm irrigation liquid deliveries are through a pipe in the canal bank, or any location where a suitable section of pipe could be installed. Embodiments can be placed in the beginning of a farm ditch and subsequently used as a culvert crossing by the farm operator. The ability to use the existing control gate at the delivery site is a low-cost measure and does not require changing the basic system to add any additional mechanized elements.

Irrigation flow measuring systems consist of a primary element that interacts with the water and a secondary element that provides information about this interaction. This information is usually the readout of the flow rate or the accumulated volume. Yet another element may be used to convert rate to volume or volume to rate. Both values are useful for irrigation management. Embodiments of the system can be configured to provide both values immediately without further processing, either at the site or back at the office. Only approximate field information is required to select a suitable pipe and reverse propeller meter system that can usually be installed in less than a half day by construction workers.

Also, a meter reader can obtain required data for monthly reports via a monthly reading. Little or no office-staff processing is required except perhaps subtracting the previous reading. No hours, or even dates, of delivery are necessary to obtain the reportable data. Another advantage is that the system is tamper resistant. The units can be expected to operate for several cropping seasons with little or no maintenance attention.

Figure 1:
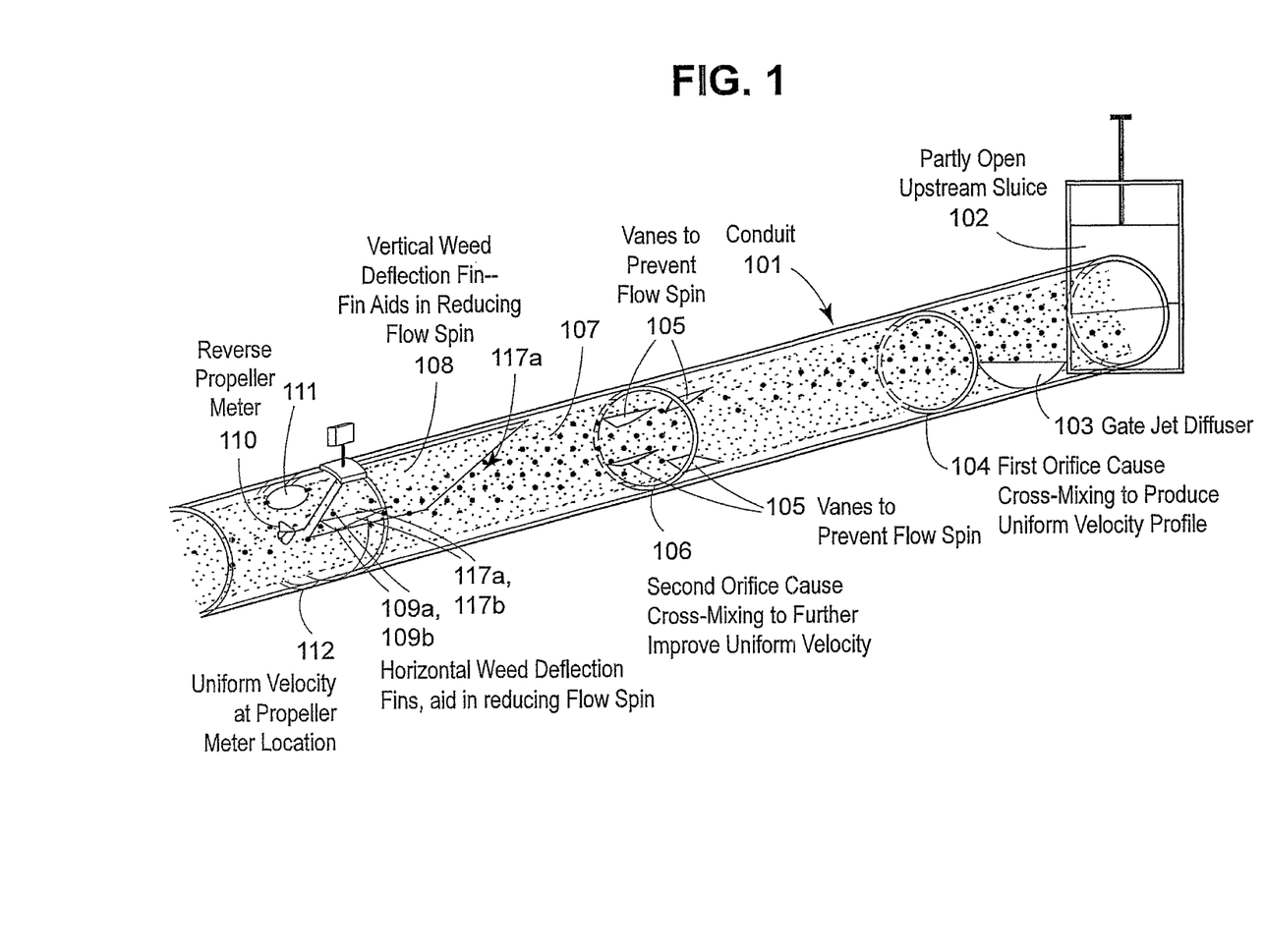
FIG. 1 shows an exemplary embodiment conduit for channeling liquid comprising appurtenances for conditioning a liquid flow.

FIG. 1 shows a conduit for channeling liquid comprising appurtenances for conditioning a liquid flow. The appurtenances are added to the conduit to mitigate the effects of upstream valves, sluice gates and/or pipe elbows to condition the pipe flow for accurate flow rate detection by a reverse propeller meter.

Referring to FIG. 1, in an embodiment disclosed is:

(a) A conduit for channeling liquid. The conduit is shown as circular pipe 101, however the conduit can be any geometric cross-section. Associated with a length of circular pipe 101, approximately 20 pipe-diameters long with a sluice gate 102 at the beginning.

(b) A diffuser 103 comprising a weir-like blade one-fourth pipe 101 diameter in height across the pipe 101 bottom and downstream from a sluice gate(s) 102 or valves (not shown) to impinge the jet from sluice gate(s) 102 or valves (not shown) and disperse the jet energy across the pipe 101 area. The weir-like blade can be placed a couple of diameters down the pipe 101 to diffuse the jet energy across the pipe 101.

(c) A first orifice 104 placed along the pipe 101 length downstream from the diffuser 103 is configured to divert flows along the pipe 101 wall and also to cause cross-mixing and improve the uniformity of velocities across the pipe 101. The first orifice 104 is configured to be relatively large with respect to the diameter of the pipe 101. For example, the downstream opening orifice can be from about 85% to about 95% open area, for instance about 90% open area. The first orifice 104 can be configured to prevent jetting down the pipe 101 wall and forced cross-mixing of the flow.

(d) An anti-spin flow component 105 comprises a plurality of vanes protruding from the pipe 101 wall. The veins are configured to halt flow spin before reaching a downstream reverse propeller 110. In an embodiment, the system comprises three or more vanes. The vanes can be configured to protrude into the flow at a distance of about one-fourth the pipe 101 diameter. In an embodiment, the vanes comprise sloping upstream edges of with dimensions of one-fourth pipe 101 diameter in the radial direction and three-fourths pipe diameter toward the inflowing water direction. The sloping edges are configured to avoid collecting weeds and debris.

(e) Downstream of the anti-spin flow component 105, a second orifice 106 is configured to cause further cross-mixing to form a more uniform velocity profile. The resulting velocity profile is similar to that of the velocity profile of a long pipe. The second orifice 106 is placed at downstream location proximate to the vanes of the anti-spin flow component 105. For example, the second orifice 106 is placed at a location substantially next to or immediately proximate to the vanes. The second orifice 106, is thus directly preceded by the anti-spin vanes that resemble "shark-fins" protruding from the pipe walls, is positioned further along the pipe 101. The second opening orifice 106 can be from about 85% to about 95% open area, for instance about 90% open area.

(f) A debris deflection component 107 comprises a large vane 108 with a plurality of side fins 109a, 109b attached to the large vane 108 on either side. The large vane 108 is aligned with the propeller 110 shaft. In an embodiment, the vane 108 includes the side two fins 109a, 109b, one on each side of the vane 108 so as to form a horizontal plane. In an embodiment, the debris deflection element 107 comprises upstream sloping edges 117a, 117b, 117c for the two fins 109a, 109c and the vane 108 respectively, for example in sloping at a proportion of one unit perpendicularly to three units longitudinally. The sloping edges 117a, 117b, 117c are configured to obtain a number of advantages, such as to avoid collecting weeds, push debris to the side around the propeller 110, and further discourage flow spin. The debris deflection component thus comprises a long vane 108 attached to the inside pipe 101 top that pushes weeds and grass down below the propeller 110 blades. Smaller side fins push the weeds sideways around the meter. A debris-free zone thus exists for the operation of the reverse propeller meter 110.

(g) A uniform velocity profile 112 is generated at approximately the indicated meter location.

(h) A reverse propeller meter 110 generates an electronic signal for determining flow rate, accumulate total flow volume, or to be used or transmitted for local or remote canal gate control using systems for processing such signals as known in the art.

Figure 3A:
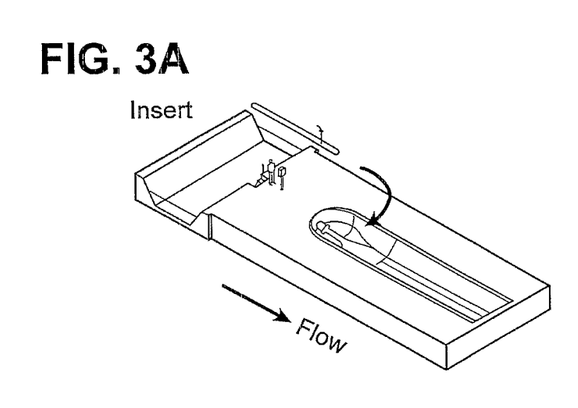
FIGS. 3A-E show embodiments of exemplary conduit installations.
Figure 3B:
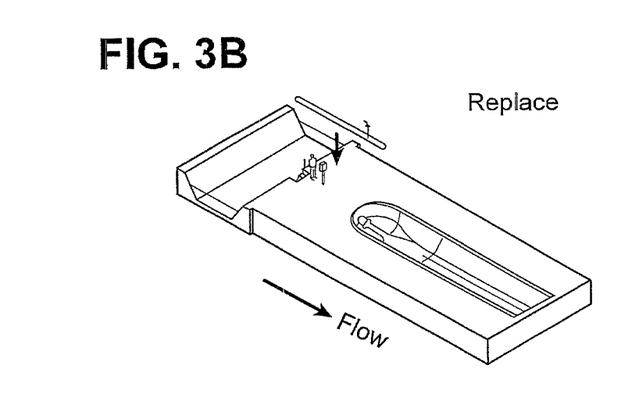
Figure 3C:
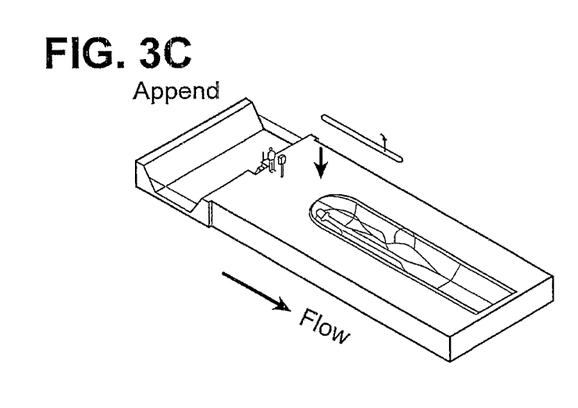
Figure 3D:
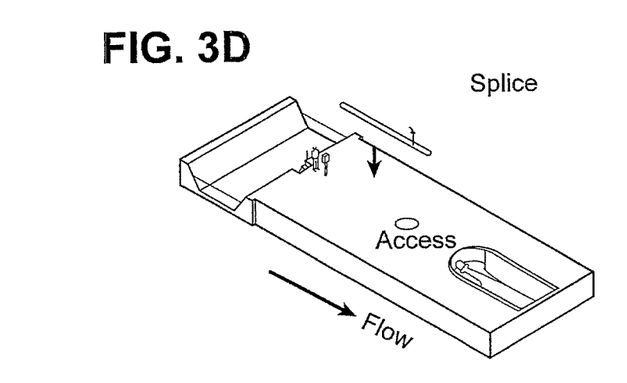
Figure 3E:
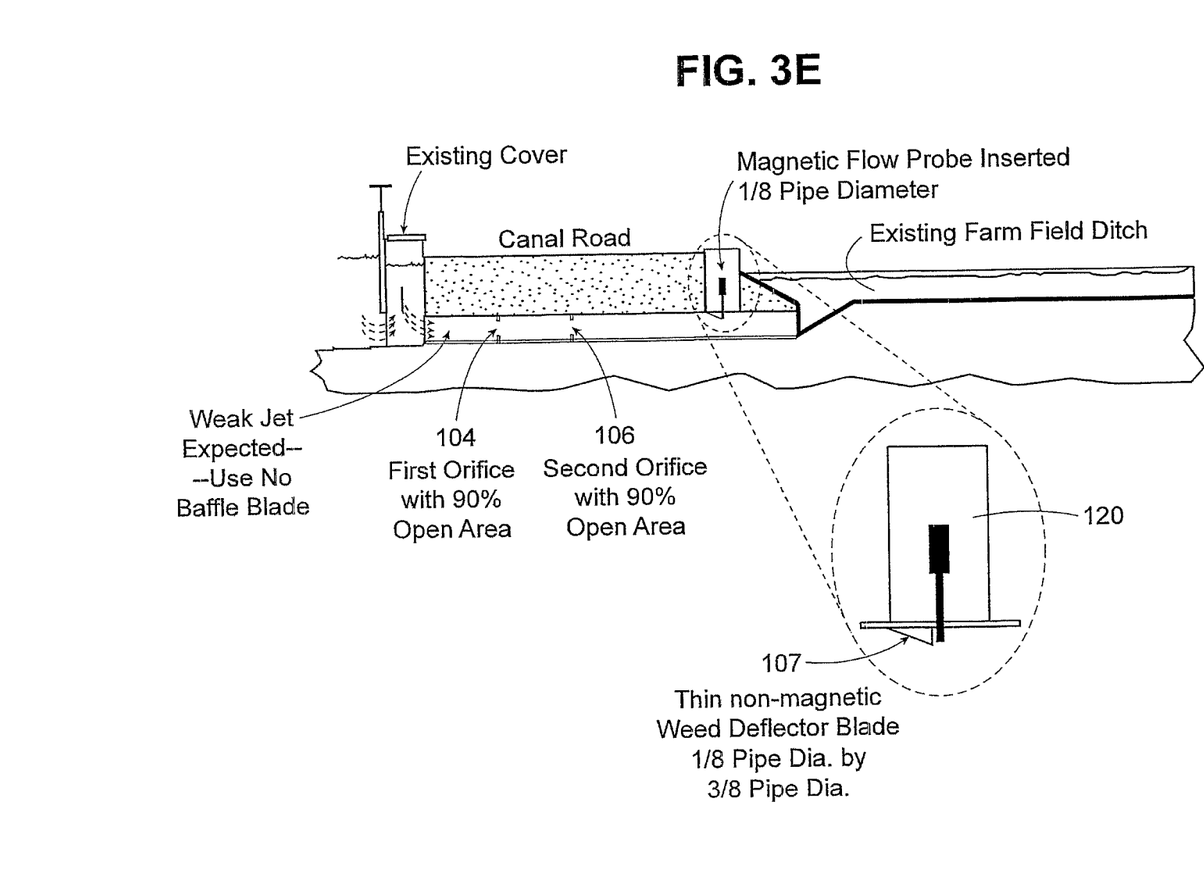

As shown in FIG. 3E, in an alternative embodiment, a magnetic, velocity probe with a debris deflection element 107 as described above described proportions can be inserted one-eighth pipe 101 diameter into the flow to determine flow velocity and provide the needed electronic signals. Instead of reverse propeller meter 110, the sensor comprises a magnetic meter 120, shown at FIG. 3E. An exemplary magnetic meter 120 can be a McCrometer Single Point Insertion Mag Meter. The Mag Meter is connected by a cable to a PLC in an RTU which measures and calculates the water flow into cfs measurements. As will be appreciated, a full pipe sensor comprising the magnetic meter 120 takes advantage of Faraday's Law of Electromagnetic Induction to measure water velocity. Because water is a conductor, water moving through a magnetic field produces a voltage. The magnitude of the voltage is directly proportional to the velocity of the water. The sensor generates an electromagnetic field, creating a voltage in the water. Two velocity electrodes, along with a ground electrode, measures this voltage. A faster water velocity produces a higher voltage. By accurately measuring this voltage, the velocity is determined and then calculated into flow measurements.

(i) In another embodiment, the system can include removable or transparent viewing port 111 to insure propeller meter is functioning.

Figure 2:
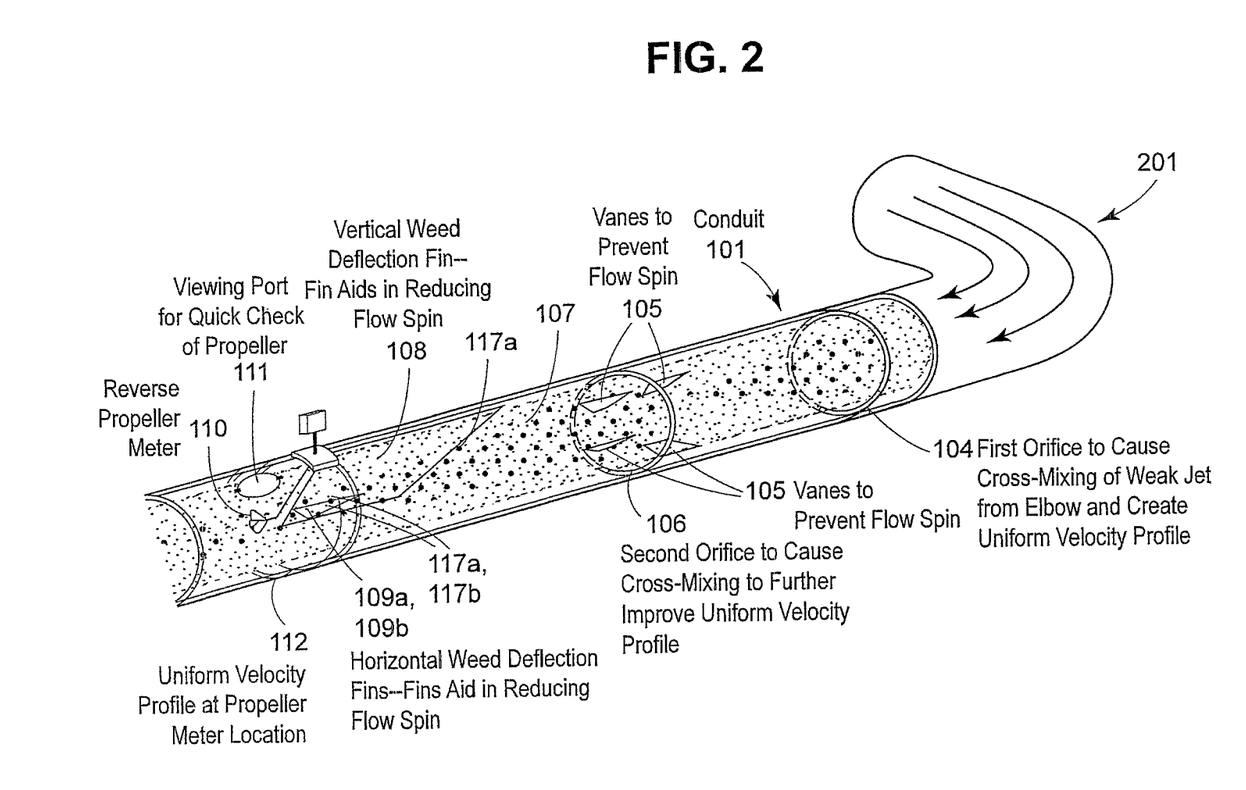
FIG. 2 shows an exemplary embodiment conduit for channeling liquid comprising appurtenances for conditioning a liquid flow.

Referring to FIG. 2 an alternate embodiment of the device is shown. As shown therein, a portion of the conduit 101, sluice gate 102 and diffuser 103 are replaced by a pipe elbow 201. In the embodiment, the jet is weaker than that of an embodiment comprising a sluice gate 102. Accordingly, the orifices 104, 106 and the anti-spin vanes 105 are sufficient to obtain the desired cross mixing and uniform velocity profile.

As noted herein, embodiments of the device can also be configured to produce an electronic output that can indicate liquid flow rate and total liquid flow volume that passed the said propeller meter in said pipe and (a) provide information for automatic gate control at the said irrigated field location (local control) for constant liquid flow to the said receiving irrigated farm field, and also (b) provide information for gate control that can be transmitted to a headquarters location for remote control and canal automation; systems for processing such electronic output are known in the art and are not further explicated here.

Installation

In embodiments, selections of the pipes and flow sensors (e.g. reverse propeller meters) can be adapted for a wide range of canal and irrigated field flow delivery situations. For example, embodiments can accommodate a range of available elevation differences between a supply canal water surface and that of the receiving irrigated farm field water surface and/or liquid flow velocities that discourage sedimentation within said pipe.

Several field situations are typically found in most irrigation delivery systems. For example, delivery of irrigation water to a farm is typically through a pipe under a maintenance road or through a canal bank. The water flow to the farm is frequently controlled by a round slide gate fitted directly onto the upstream end of the pipe, either vertically or at an angle that matches the canal wall slope, or by a rectangular sluice gate that controls water to a head-box arrangement to which the pipe is then attached.

Design Criteria

An exemplary design selection criteria can be employed is to attain a minimum velocity of about 3-ft per second to discourage sediment accumulation in the pipe. Another criterion is to minimize head losses by keeping the velocities below about 7-ft per second. While in some cases it may be desirable to maintain a minimum velocity, the upper value of the velocity can be increased, as for example wherever the water levels of the delivery canal and a farm ditch is large enough.

Examples of accommodating field delivery points are depicted in FIGS. 3A-3E. These include installations to (I) insert, (2) replace, (3) append, or (4) splice.

FIG. 3A shows an "insertion" installation, which is appropriate when the selected pipe and meter size is smaller that the original pipe. In this case, the original pipe may be large enough to allow low velocities and sedimentation. If so, the original pipe can be cleared of sediment deposits as is the case shown in FIG. 3A.

Typically, with this scenario, enough new pipe length is used to insert it substantially proximate to the upstream slide gate, for example a few inches. Then, enough pipe length is added to place the meter head beyond the original pipe outlet end at the field ditch side.

If the supply canal is dry, the slide gate can be opened and workers can place concrete grout around the inserted pipe. When the supply slide gate is not dry and therefore must remain closed, a grouting hole is drilled through the top of the original pipe and fills enough of the cavity to hold the insertion in place. Therefore retrofits can be installed throughout the year. This process does not usually need to provide a leak-tight seal, because the slide gate should provide this to all downstream points. Also, the insertion pipe length can be limited to the approximate 20 pipe diameters used to control the flow profile and the weed deflection hardware, because it need not be accessed from the slide-gate end.

FIG. 3B shows a "replace" installation. In some cases, for example in local farm geography, due to old pipe condition and excessive length of the canal bank thickness, the old pipe can be dug out and removed and replaced it with the metering pipe. This can include a new farm delivery gate. Again enough pipe length is supplied to place the meter head in an accessible location near the outlet end.

FIG. 3C shows an "append" installation. Where the farm geography and local access to property allows, the metering pipe can be added to the end of an existing outlet pipe. In many cases, this installation places the metering head well onto farm property and local agreements to such intrusion may be necessary.

FIG. 3D shows a "splice" installation. Such a method of installation can be used, for example, when the pipe under a road is long and intrusion onto farm property is not desired. In such a case, a section of the supply pipe can be removed and replaced with the length of the metering pipe. In an embodiment of the method, a manhole with a cover is built to provide access to the propeller meter head. The manhole structure can be constructed to allow road traffic. In another example, the canal slide gate opens into a long pipe that may travel many yards before discharging to a farm ditch. Splicing into this length is a viable and easily installation option.

FIG. 3E shows an installation schematic for an embodiment wherein the system's flow sensor comprises a magnetic sensor. Installation follows a sequence of excavating the soil downstream of the gate and a small portion of the concrete lined farmer's ditch. The upstream end of the pipe is collared into the downstream canal discharge pipe as the end of the pipe projects into the farmer's ditch where the headwall is replaced. An access manhole structure is fit about the meter where a threaded access pipe protects the insertion meter as well as giving it an easy means for any required maintenance. A conduit from the meter is buried underground to an electrical panel.

In another embodiment (not shown) an installation method comprises placing the metering pipe in an existing ditch. For example, the metering pipe system can be placed into a farm channel or ditch and overfilled with field soil to assure that the flow must flow through the pipe and be recorded. The soil covering can be applied so as to convert the pipe section to a ditch crossing, provided the structural properties for the pipe are properly selected using materials known in the art. In such an embodiment, the metering system is not connected to the inlet gate piping. In some cases, farm canal walls upstream to the ditch heading can be increased.

As will be appreciated, embodiments of the pipe and propeller flow measuring system as described herein can be attached to the existing canal head gate and pipeline system that extends through a delivery canal bank. This attachment and field installation required ordinary construction skills. The pipe does not require extreme levelness or precision placement.

Figure 4:
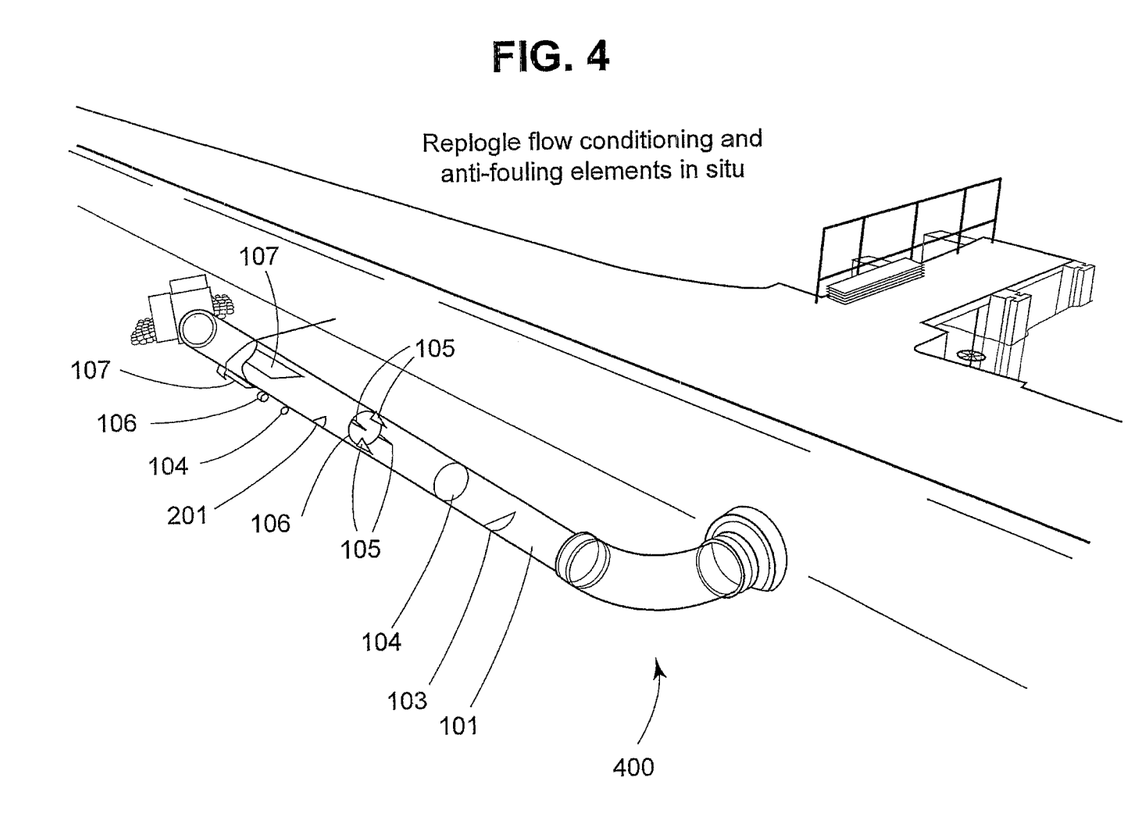
FIG. 4 shows an embodiment of an exemplary parallel conduit system.
Figure 5:
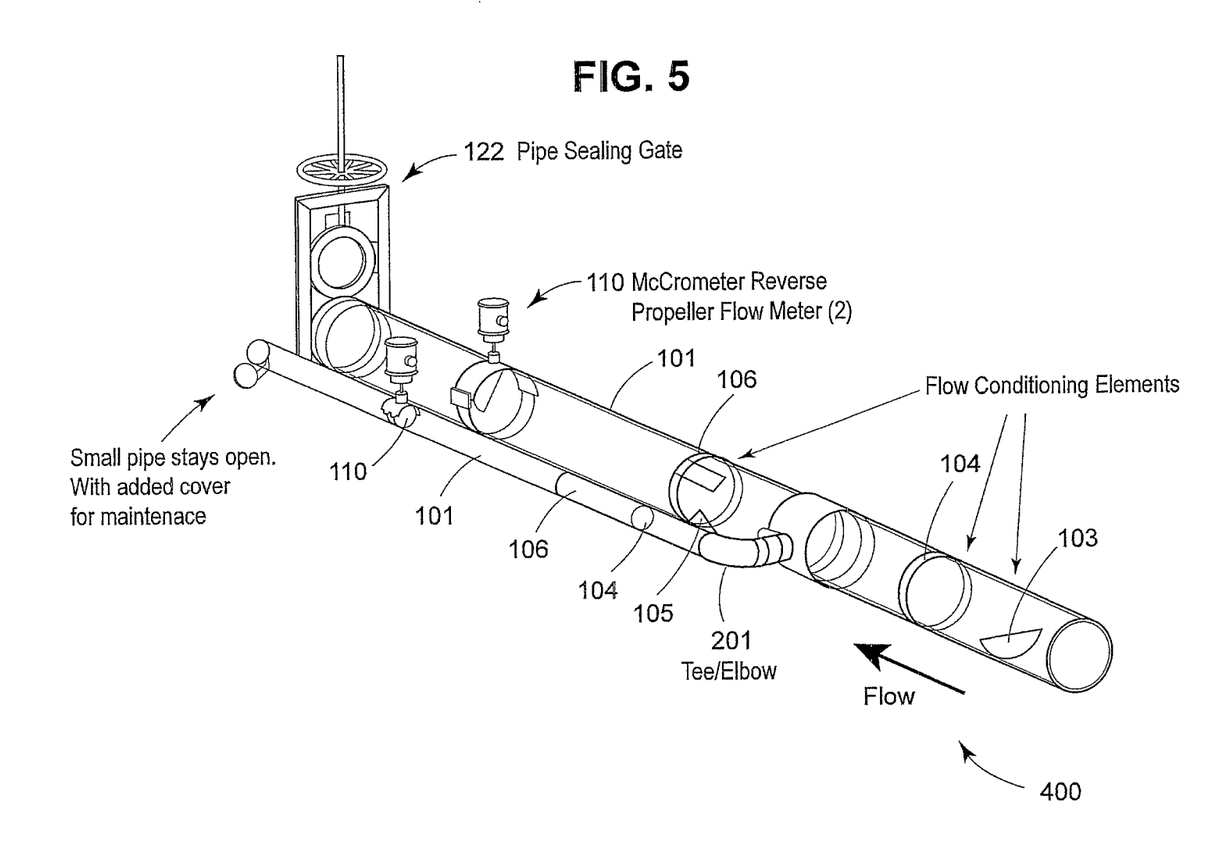
FIG. 5 shows an embodiment of an exemplary parallel conduit system.

FIGS. 4 and 5 show embodiments of a system and installation method comprising parallel multiple meter installation 400. Such embodiments can be configured to accommodate a wide range of liquid flow rates. The embodiment comprises installing a pipe elbow 201 and metering system as shown in FIG. 2, on a farm side of the usual pipe-under-road situation and installing a metering system as shown in FIG. 1 parallel to the road so as to avoid significant invasion of the farm field.

As shown in FIG. 4, one embodiment shows adding a pipe 110 to the outlet end of an existing field structure. One exemplary advantage is that the addition often can be implemented without changing the irrigation delivery structure itself, and results in minimal invasion of the farm field. As shown in FIG. 4, the pipe 101 includes an elbow joint 201 to the existing outlet that is turned to parallel to a road-field boundary. A reverse propeller meter 110, then detects the flow velocity in the pipe for determining volumetric delivery. The pipe 101 is equipped with appurtenances as described herein to condition the flow from a gate jet or pipe elbow 201 for accurate velocity detection with the time-tested, reverse-propeller meter 110, and to bypass weeds and grass.

A multiple meter installation can accommodate a flow rate range that is usually beyond the limits of a single meter. For large flows, a control gate at the pipe 101 end is open, or only closed enough to maintain full pipe flow to assure proper propeller 110 meter sensing. The upstream entry gate 122 (FIG. 6) at the supply canal controls actual flow rate. In an embodiment, both meters 110 can be configured to register flow simultaneously, or in another embodiment, a shutoff gate can be installed on the smaller pipe. FIG. 5 shows an embodiment where the smaller pipe has no shutoff gate.

A multiple pipe outlet as shown in FIGS. 4 and 5 can accommodate a wide range of flow rates, as for example associated with rice farming. Rice-farm operators typically desire a large flow for initial field flooding and a small maintenance flow thereafter, such as that needed for the current method of rice-crop culture that demands quick initial flooding of seeded rice fields with large flow rates followed by season-long low, so-called maintenance flows, that are too small to be accurately recorded by the larger main flow measuring system. This maintenance flow rate amounts to about ¼ inch per day. The ratio of the large to small flow rate may be more than 20:1. The dual metering system 400 that can accurately measure a wide range in flow rates, thereby assuring the delivery of large flow rates to quickly field large basins In another embodiment, as for example with small maintenance flows, the larger pipe outlet-end gate can be closed using a pipe sealing gate 122, and the only the small pipe registers flow, which is controlled by small opening of the upstream gate in whatever way the farm previously delivered maintenance flows. In this case, installation is such that the pipe connections are constructed to prevent significant leakage due to the closing of the large pipe-end gate. Both meter totals provide the information for the annual report.

Figure 6:
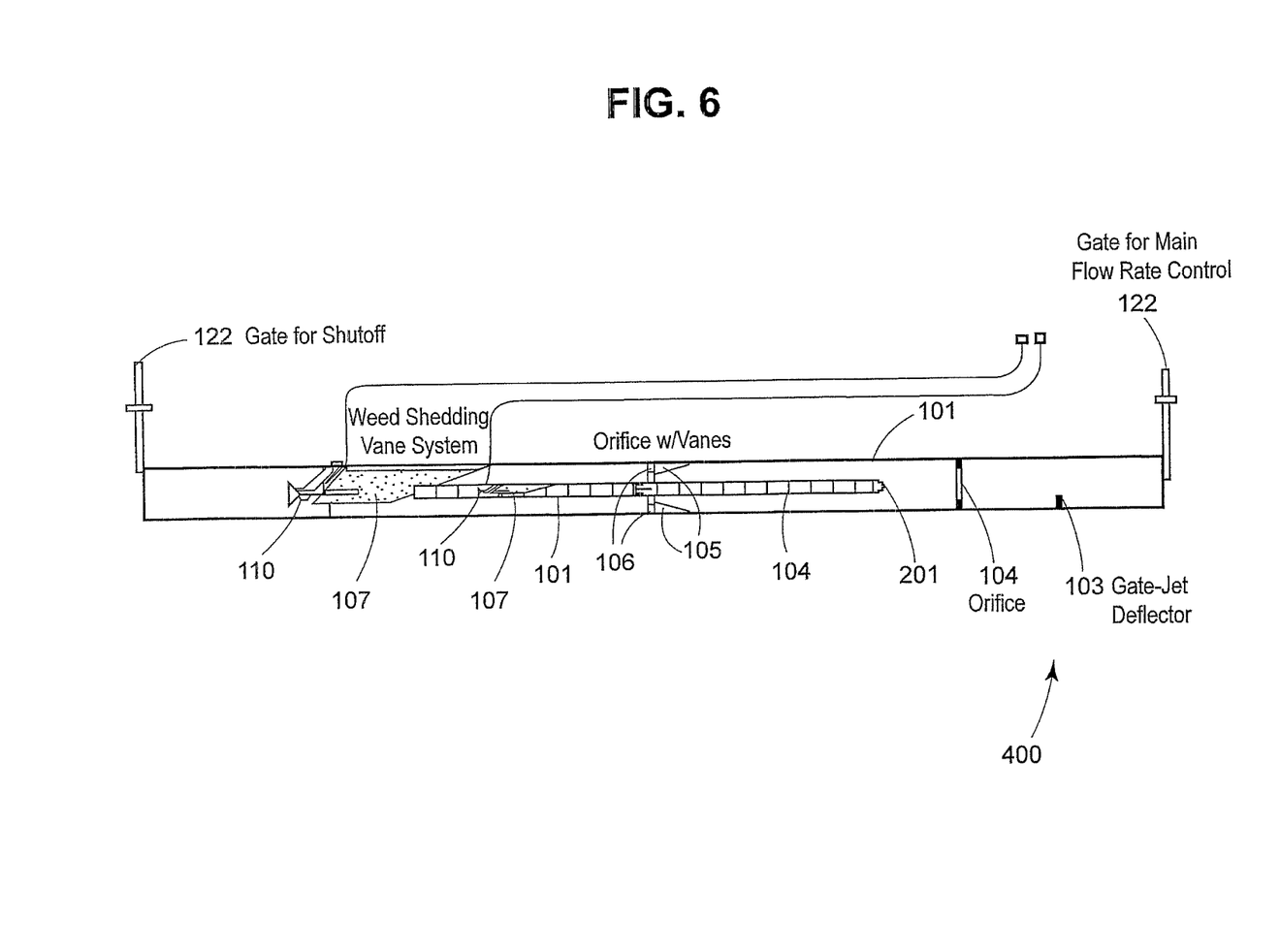
FIG. 6 shows an embodiment of an exemplary parallel conduit system.

FIG. 6 illustrates an embodiment of the system including basic components for a high flow rate and low maintenance flow rate using a typical 24-inch pipe and a parallel, but similarly equipped 6-inch pipe.

Table 1 lists the commonly available pipe sizes in terms of inside pipe diameter. It also lists the estimated pipe system losses to expect. Thus, where the head difference is small and the desired delivery rate is high, the table will suggest a large pipe. Table 1 also suggests that the pipe velocity be maintained above about 3 feet per second to discourage sedimentation. This may not be practical for small head differences requiring large pipes. However, these situations frequently have water with low suspended sediment loads and can usually be made to work.

set forth above, as such variations and modification are intended to be included within the scope of the invention. Therefore, the scope of the appended claims should not be limited to the description and illustrations of the embodiments contained herein.

The invention claimed is:

1. A system for metering liquid flowing in a conduit comprising:
    a flow sensor disposed in the conduit;
    a debris deflection component positioned upstream of the flow sensor in the conduit and configured to prevent debris from fouling the flow sensor, and

| CANAL REVERSE-PROPELLER WATER METERING SYSTEM ||||||||||||
| For pipe sizes 16-in to 30-inch I.D. ||||| For pipe sizes 4-inch to 12-inch I.D. |||||||
| Size in | Q cfs | Q gpm | velocity ft/s | V^2/2 g inches | Headloss in. | Size in | Q cfs | Q gpm | velocity ft/s | V^2/2 g inches | Headloss in. |
| --- | --- | --- | --- | --- | --- | --- | --- | --- | --- | --- | --- |
| 30^A | 30 | 13464 | 7.55 | 10.62 | 27.34 | 12" max | 5.57 | 2500 | 10.21 | 19.45 | 35.34 |
|  | 25 | 11221 | 5.1 | 4.836 | 12.33 |  | 5.00 | 2244 | 6.36 | 7.56 | 21.25 |
|  | 23 | 10323 | 4.68 | 4.092 | 10.40 |  | 4.00 | 1795 | 5.09 | 4.84 | 13.62 |
|  | 20 | 8977 | 4.07 | 3.096 | 7.67** | 12 | 3.00 | 1346 | 3.82 | 2.72 | 7.67** |
|  | 15 | 6732 | 3.1* | 1.74 | 4.41 |  | 2.75 | 1234 | 3.50* | 2.29 | 6.46 |
|  | 10 | 4488 | 2.52 | 1.1796 | 3.06 |  | 2.00 | 898 | 2.55 | 1.21 | 3.43 |
|  | 5 | 2244 | 1.258 | 0.295 | 0.77 |  | 0.50 | 224 | 0.635 | 0.08 | 0.22 |
| 27^A | 25 | 11221 | 6.29 | 7.38 | 18.77 | 12" min | 0.334 | 150 | 0.426 | 0.03 | 0.09 |
|  | 20 | 8977 | 5.03 | 4.716 | 12.02 | 10" max | 4.01 | 1800 | 7.35 | 10.08 | 30.82 |
|  | 17.5 | 7855 | 4.4 | 3.612 | 9.21 |  | 4.00 | 1795 | 7.33 | 10.03 | 30.67 |
|  | 15 | 6732 | 3.8 | 2.652 | 6.77** |  | 3.00 | 1346 | 5.50 | 5.64 | 17.20 |
|  | 12.5 | 5610 | 3.14* | 1.848 | 4.71 | 10 | 2.00 | 898 | 3.67 | 2.51 | 7.71** |
|  | 10 | 4488 | 2.52 | 1.1796 | 3.02 |  | 1.75 | 785 | 3.20* | 1.92 | 5.90 |
|  | 5 | 2244 | 1.26 | 0.2952 | 0.76 |  | 1.50 | 673 | 2.75 | 1.41 | 4.34 |
| 24^A | 25 | 11221 | 7.96 | 11.82 | 30.07 | 10" min | 0.279 | 125 | 0.51 | 0.00 | 0.11 |
|  | 20 | 8977 | 6.4 | 7.56 | 19.27 | 8" max | 3.340 | 1500 | 9.57 | 17.10 | 29.28 |
|  | 15 | 6732 | 4.77 | 4.248 | 10.86 |  | 2.230 | 1000 | 6.38 | 7.60 | 24.47 |
|  | 12 | 5386 | 3.82 | 0.227 | 6.96** |  | 1.559 | 700 | 4.47 | 4.86 | 13.33 |
|  | 10 | 4488 | 3.1* | 1.896 | 4.82 |  | 1.225 | 550 | 3.51 | 2.292 | 7.43** |
|  | 5 | 2244 | 1.59 | 1.896 | 2.29 | 8 | 1.114 | 500 | 3.19* | 1.90 | 6.16 |
| 22.44^A | 20 | 8977 | 7.28 | 9.888 | 24.42 |  | 0.668 | 300 | 1.91 | 0.68 | 2.23 |
|  | 15 | 6732 | 5.46 | 5.544 | 13.74 |  | 0.446 | 200 | 1.28 | 0.30 | 1.01 |
|  | 13 | 5835 | 4.73 | 4.176 | 10.33 | 8" min | 0.223 | 100 | 0.64 | 0.08 | 0.25 |
|  | 12 | 5386 | 4.37 | 3.564 | 8.81 | 6" max | 2.675 | 1200 | 13.62 | 34.62 | 123.08 |
|  | 11 | 4937 | 4.01 | 2.988 | 7.40** |  | 1.114 | 500 | 5.67 | 6.01 | 21.47 |
|  | 10 | 4488 | 3.64 | 2.472 | 6.12 |  | 0.891 | 400 | 4.53 | 3.84 | 13.77 |
|  | 9 | 4039 | 3.28 | 2.004 | 4.96 |  | 0.668 | 300 | 3.40* | 2.16 | 7.78** |
|  | 8.5 | 3815 | 3.09* | 1.788 | 4.43 |  | 0.446 | 200 | 2.27 | 0.96 | 3.48 |
|  | 5 | 2244 | 1.82 | 0.618 | 1.53 |  | 0.223 | 100 | 1.135 | 0.24 | 0.89 |
|  | 3 | 1346 | 1.09 | 0.2232 | 0.56 | 6" min | 0.201 | 90 | 1.021 | 0.19 | 0.72 |
| 21* | 15 | 6732 | 6.24 | 0.605 | 15.60 | 4" max | 1.337 | 600 | 15.32 | 43.80 | 156.85 |
|  | 12 | 5386 | 4.99 | 0.387 | 12.39 |  | 1.114 | 500 | 12.76 | 30.41 | 124.21 |
|  | 10 | 4488 | 4.16 | 0.269 | 10.27 |  | 0.668 | 300 | 7.659 | 10.94 | 44.93 |
|  | 8 | 3591 | 3.33 | 0.172 | 8.17** | 4 | 0.446 | 200 | 5.107 | 4.87 | 20.09 |
|  | 6 | 2693 | 2.49 | 0.097 | 6.10 |  | 0.290 | 130 | 3.32 | 2.05 | 8.55 |
|  | 5 | 2244 | 2.08 | 0.067 | 5.07 |  | 0.2785 | 120 | 3.06* | 1.75 | 7.31** |
|  | 4 | 1795 | 1.66 | 0.043 | 4.04 |  | 0.223 | 100 | 2.55 | 1.22 | 5.10 |
|  | 3 | 1346 | 1.25 | 0.024 | 3.02 | 4" min | 0.111 | 50 | 1.28 | 0.30 | 1.31 |
| 16^A | 10 | 4488 | 7.16 | 9.564 | 24.67 |  |  |  |  |  |  |
|  | 8 | 3591 | 5.73 | 4.032 | 14.25 |  |  |  |  |  |  |
|  | 6 | 2693 | 4.3 | 3.444 | 8.91 |  |  |  |  |  |  |
|  | 5.5 | 2469 | 3.94 | 2.892 | 7.50** |  |  |  |  |  |  |
|  | 5 | 2244 | 3.58 | 2.388 | 6.21 |  |  |  |  |  |  |
|  | 4.5 | 2020 | 3.22* | 1.98 | 5.06 |  |  |  |  |  |  |
|  | 4 | 1795 | 2.86 | 1.536 | 3.97 |  |  |  |  |  |  |
|  | 2 | 898 | 1.4 | 0.384 | 1.00 |  |  |  |  |  |  |

3.0* - Suggested minimum velocity to discourage sedimentation
7.0** - Suggested minimum headloss to be provided
30^A Max imun and minimum flow rates not listed..

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction a plurality of flow conditioning components disposed in the conduit upstream of the debris deflection component, wherein the debris deflection component diverts debris around the flow sensor, without collecting debris in the system, and wherein the plurality of flow conditioning components comprise a first substantially open orifice and a second substantially open orifice, the second substantially open orifice being positioned downstream of the first orifice, the first orifice being configured to reduce an open area of the conduit, divert flows along a wall of the conduit, and force cross-mixing of the flows along the wall of the conduit, and wherein the plurality of flow conditioning components comprise a weir-like diffuser that is disposed at a bottom of the conduit and configured to impinge a jet flow, the weir-like diffuser being positioned upstream of the first orifice.

2. The system of claim 1 further comprising an anti-flow spin component.

3. The system of claim 1, wherein the flow sensor comprises a flow sensor selected from the group consisting of a reverse propeller meter, pitot tubes, and acoustic based probes, and a magnetic sensor.

4. The system of claim 3 wherein the flow sensor is the reverse propeller meter.

5. The system of claim 1, wherein the plurality of flow conditioning components are configured to create a substantially uniform liquid flow profile to the flow sensor.

6. The system of claim 1 wherein the plurality of flow conditioning components are configured to condition a liquid flow formed through a partly open sluice gate upstream of the flow conditioning component.

7. The system of claim 1 wherein the plurality of flow conditioning components are configured to condition a liquid flow formed through a pipe elbow or a pipe tee positioned upstream of the plurality of flow conditioning components.

8. The system of claim 2 wherein the anti-flow spin component comprises a plurality of fins protruding from a wall of the conduit and positioned upstream and proximate to the second orifice.

9. The system of claim 8 wherein the second orifice and the plurality of fins are configured to reduce flow spin and improve the accuracy of flow-velocity sensing by said flow sensor.

10. The system of claim 1 further comprising an examination port for examining the flow sensor.

11. The system of claim 10, wherein the examination port is removable from the system.

12. The system of claim 11, wherein the examination port is transparent.

13. The system of claim 1, wherein the diameter of the conduit is at least 4 inches.

* * * * *